United States Patent [19]
Effinger

[11] Patent Number: 4,770,362
[45] Date of Patent: Sep. 13, 1988

[54] FISHING REEL WITH REMOVABLE SIDE PLATE RING
[75] Inventor: Rudolph Effinger, Feasterville, Pa.
[73] Assignee: Penn Fishing Tackle Mfg. Co., Philadelphia, Pa.
[21] Appl. No.: 74,006
[22] Filed: Jul. 16, 1987
[51] Int. Cl.⁴ .............................................. A01K 89/00
[52] U.S. Cl. ............................. 242/84.1 R; 242/84.42
[58] Field of Search .............. 242/84.1 R, 84.4, 84.41, 242/84.42, 84.43

[56] References Cited
U.S. PATENT DOCUMENTS

| | | | |
|---|---|---|---|
| 516,715 | 3/1894 | Wellington | 242/84.41 |
| 1,608,490 | 11/1926 | Catucci | 242/84.42 |
| 2,150,088 | 3/1939 | White | 242/84.5 |
| 2,184,242 | 12/1939 | Pflueger | 242/84.42 |
| 2,361,239 | 10/1944 | Ransom | 242/84.5 |
| 2,400,317 | 5/1946 | Reynolds | 242/84.1 R |
| 2,512,357 | 6/1950 | Maynes | 242/84.41 |
| 3,478,979 | 11/1969 | Henze | 242/84.54 |
| 3,603,524 | 9/1971 | Nurmse | 242/84.1 R |
| 4,386,742 | 6/1983 | Moss et al. | 242/84.1 R |
| 4,390,147 | 6/1983 | Zukerman | 242/215 |
| 4,572,455 | 2/1966 | Noda | 242/84.1 R |

Primary Examiner—John M. Jillions
Attorney, Agent, or Firm—Dann, Dorfman Herrell and Skillman

[57] ABSTRACT

A fishing reel having a side frame plate and a removable side plate ring which facilitates access to the worm gear assembly.

7 Claims, 2 Drawing Sheets

FISHING REEL WITH REMOVABLE SIDE PLATE RING

FIELD OF THE INVENTION

The invention relates to a fishing reel, and more particularly, to an improved fishing reel having a side frame plate and removable side plate rings which cooperatively define a portion which permits direct access to the worm gear assembly.

BACKGROUND OF THE INVENTION

Generally, fishing reels of the type disclosed herein include a main frame portion to which is mounted a rotatable spool for gathering and paying out fishing line. In a reel of this type, the main frame portion includes side plates which define an open area between the side plates of the frame. The rotatable spool is mounted in an open space between the side plates. Fishing reels of this type may further include a traversing line guide to assure that gathered line is collected uniformly on the spool. A worm shaft is provided parallel to the spool shaft, and is suitably spaced therefrom to impart the desired motion to the line guide to provide a level wind of the line on the spool. The worm shaft includes a grooved pattern which receives a projection from the line guide. Rotation of the worm shaft causes the line guide to repeatedly traverse, in alternating directions, the length of the worm shaft, thereby depositing the fishing line uniformly across the spool. Rotation of the worm shaft is caused by the operative coupling of the worm shaft to the main shaft of the reel, which is rotated as the fishing reel is wound. Accordingly, as the user turns the handle of the reel to collect line, a corresponding rotation is caused in the worm shaft, and such corresponding movement causes the line guide to traverse the worm shaft at a spaced distance from the spool.

In reels of the aforesaid type, access to the worm drive gear and worm shaft is generally difficult and cumbersome. The worm drive gear and shaft may require service, however, and it has been found desirable in a fishing reel having a worm drive gear and worm shaft to provide means for allowing ready access to the gear and gear shaft for repair or replacement.

SUMMARY OF THE INVENTION

An object of the invention is to provide a fishing reel which is simple in construction and which construction allows access to the worm drive gear and worm shaft for repair or replacement with minimal effort.

Another object of the invention is provide a fishing reel which has protection rings extending about the peripheries of the side plates of the main frame and which obviates the need for a separate worm gear cover.

In accordance with the invention, a fishing reel is provided having a main frame having side plates, a rotatable spool between the side plates, and a main shaft for rotating the spool. A worm shaft is provided at a spaced distance from and parallel to the main shaft. A line guide travels on the worm shaft for depositing line uniformly on the spool.

Side plate rings are provided on the side plates of the main frame. On the side of the reel where the worm gear is located, the side plate protrudes outwardly through the center of the side ring. A recess is provided in the side plate for accessing the worm gear. The raised protrusion of the side plate is shaped so as not to cover the worm gear. The side plate ring is shaped to close the recess and cover the worm gear when the side ring is attached to the side plate.

DETAILED DESCRIPTION OF THE INVENTION

Figure 1:
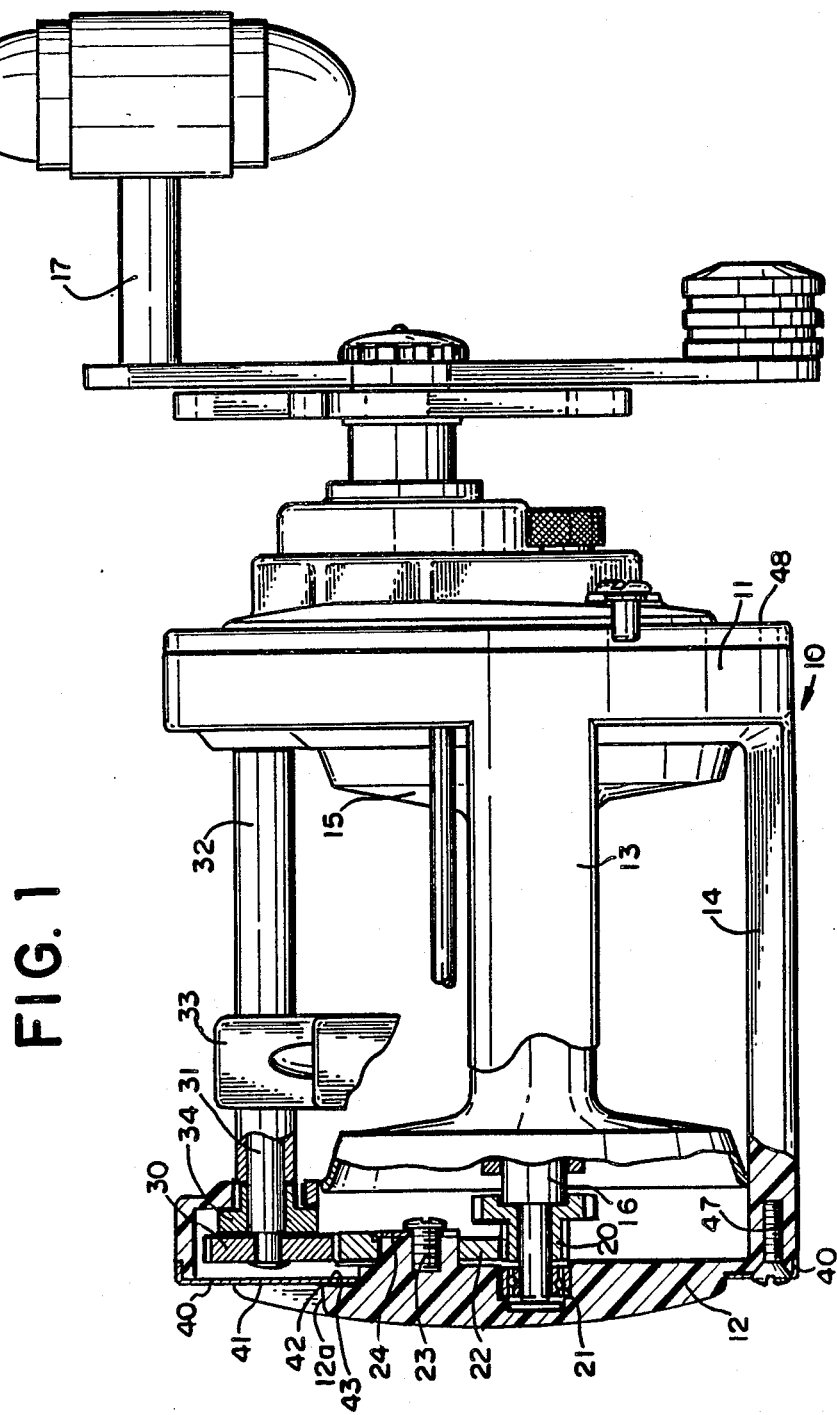
FIG. 1 is a front elevational view of a fishing reel made in accordance with the invention, partially broken away to reveal the operative elements of the worm gear assembly and its connection to the main shaft.

Referring to FIG. 1, a fishing reel made in accordance with the invention and comprising the preferred embodiment includes a main frame 10 having spaced apart side plates 11 and 12, and transverse connecting portions 13 and 14. Rotatably supported within the reel between the side plates 11 and 12 is a spool 15 which covers a spindle (not shown). A main shaft 16 is disposed within the spool 15, the shaft 16 being operatively connected by a main gear (not shown) which is connected operatively to the spindle by a pinion (also not shown). Rotation of a handle 17 causes the main gear and pinion to rotate the main shaft 16. The foregoing structure of the fishing reel is conventional and is therefore not described in more detail.

The main shaft 16 is operatively coupled to a spool gear and ratchet assembly 20 which is maintained in side plate 12 by bearings 21. The spool gear and ratchet assembly 20 is positioned to operatively engage an idler gear 22 which is mounted to the inner face of side plate 12 using idler gear screw 23 and idler gear washer 24. Worm drive gear 30 operatively connects to idler gear 22 to be rotated thereby and is mounted to a worm shaft 31. The worm shaft 31 is covered by a worm shaft shield 32. The worm shaft 31 and worm shaft shield 32 extend transversely between side plates 11 and 12 in spaced parallel relation to the spool 15, generally at the periphery of the fishing reel.

The worm shaft 31, by its rotation, causes a line guide 33 to traverse the length of the worm gear shaft back and forth in a known manner. Specifically, worm shaft 31 is provided with a pattern of grooves (not shown) which engage a projection (not shown) on the line guide, which together act to cause the line guide to traverse the length of the worm gear shaft as the worm shaft is rotated by the worm drive gear. It will be apparent that rotation of the worm gear, and hence the worm gear shaft, is coupled to the main shaft 16, such that when line is wound onto the spool by rotating the handle 17, motion is transferred from the main shaft 16 through the spool gear and ratchet 20 through idler gear 22 to worm drive gear 30. The drive gear 30 is housed in an opening 39 through the side plate 12 so as to be accessible from the exposed side of the reel side plate.

Figure 2:
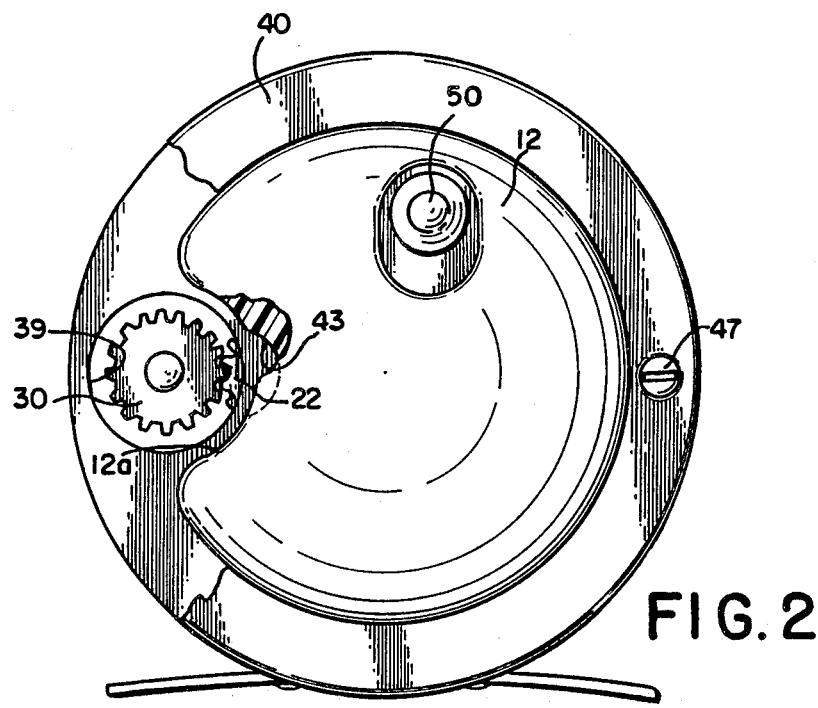
FIG. 2 is a side view of a reel made in accordance with the invention showing the side of the reel with the side plate ring broken away where the worm drive gear is provided.
Figure 3:
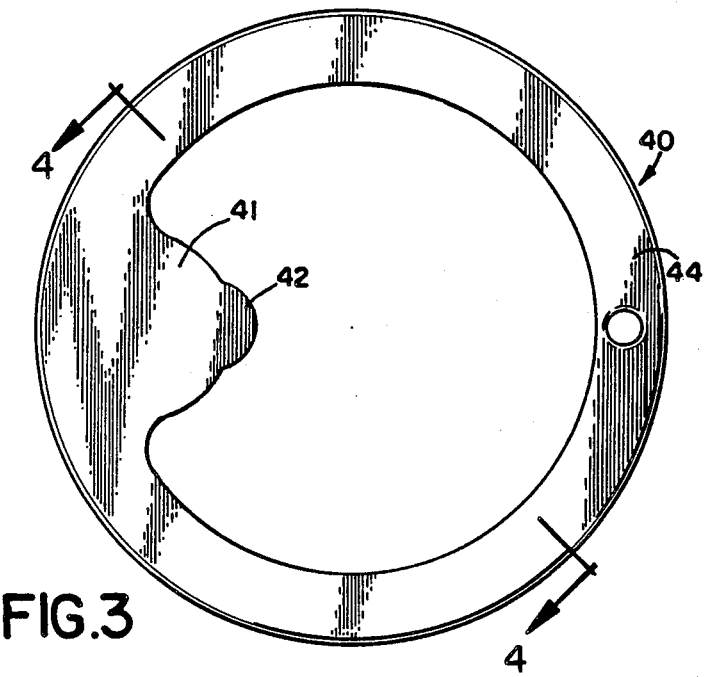
FIG. 3 is a face view of the side plate ring illustrated in FIG. 2.
Figure 4:
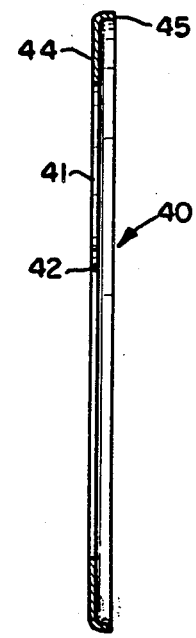
FIG. 4 is a traverse sectional view through the ring of FIG. 3.

Referring to FIGS. 1 and 2, a side plate ring 40 is provided on the end of the reel proximate to the worm gear 30. As shown in the figures, the side plate ring 40 is circular and fits around and encircles a protruding central portion of the side plate 12, which protruding portion extends outwardly through the central opening of the side plate ring when the side plate ring is in place. The protruding portion of side plate 12 is provided with a recess 12a in registry with the worm drive gear 30 and its housing 39. Side plate ring 40 is provided with a tab 41 (FIG. 3) which is coextensive, in a mating configuration, with the recess 12a. As best seen in FIG. 1, the tab has an extension 42 which is adapted to engage in an undercut 43 at the base of the recess 12a to hold side plate ring 40 against outward movement from side plate 12. The opposing end of side plate ring 40 is fastened to side plate 12 by a screw 47 at the side diametrically opposite to the tab 41. The ring has an annular face portion 44 which continuously overlies the entire marginal portion of the side plate 12. The face portion 44 and the tab 41 are coplanar and have a circumferential flange 45 which is dimensioned to snugly embrace the outer periphery of the side plate 12. Thus, the ring also serves to protect the end plate from damage during use.

It will be appreciated that, in order to remove the side ring 40, and thereby expose the worm gear 30 for removal of the worm drive gear 30 and/or the worm shaft 31, it is necessary only to remove screw 47 and disengage the tab extension 42 from its position within the undercut 43 in the recess 12b of the side plate 12.

A similar ring 48 is mounted in the side plate 11, for example by a plurality of screws or other features, since the ring 48 need not be as readily removable as the ring 40. The ring overlies the marginal portion of the plate 11 and has a circumferential flange which snugly embraces the periphery of the plate 11 to protect it from damage.

Referring to FIG. 2, the fishing reel may include a standard clicker assembly. The clicker assembly, when engaged, allows the user to detect audibly the amount of line being paid out from the spool. Such an assembly, which is well-known in the art, includes a click button 50 which is movable from an engaged to a disengaged position. Since this assembly is mounted in the protruding part of the end plate 12, it does not interfere with the ready removal of the ring 40.

It will be seen from the foregoing that an arrangement has been provided whereby access to the worm drive gear and worm shaft has been facilitated and which structure eliminates the need for a separate cover means apart from the reel's side ring for protectively covering the worm gear assembly.

I claim:
1. A fishing reel comprising:
   a main frame having a first side plate and a second side plate held in a spaced apart relationship;
   a rotatable spool mounted between said side plates;
   a central shaft mounted for rotation within said spool and said side plates;
   a main gear causing rotation of said central shaft;
   a worm drive gear proximate to said first side plate and operatively connected to said central shaft to be rotated upon the rotation thereof;
   a worm shaft coupled to said worm drive gear for rotation thereby, said worm gear connecting and spanning the distance between said side plates in spaced parallel relation to said spool;
   a line guide engaging said worm shaft such that when said worm shaft is rotated, said line guide traverses along the length of said worm shaft;
   a recess in said first side plate positioned to provide access to the worm drive gear and worm shaft from the exposed side of said first side plate; and
   a removable side plate ring for covering the perimeter of said first side plate including said recess proximate to said worm drive gear, said ring having an open center and a tab corresponding to the shape of said recess, said tab extending inwardly within said open center to overlie said recess, whereby said ring covers said recess when in place and exposes said recess when removed.

2. A fishing reel as set forth in claim 1, wherein said first side plate protrudes axially through and beyond the open center of said side plate ring.

3. A fishing reel as set forth in claim 2 wherein the protruding portion of said first side plate is undercut adjacent said recess to receive a part of said tab for retentively engaging said ring.

4. A fishing reel according to claim 3 wherein said recess is generally circular and surrounds said worm drive gear, and said tab is generally semicircular with a portion extending to engage in said undercut part of the side plate.

5. A fishing reel according to claim 4 including a single releasable fastener positioned to engage said ring substantially diametrically opposite said tab and engaging said side plate to afford removal and remounting of said ring on said side plate.

6. A fishing reel comprising:
   a main frame having a first side plate and a second side plate held in a spaced apart relationship;
   a rotatable spool mounted between said side plates;
   a central shaft mounted for rotation within said spool and said side plates;
   a main gear causing rotation of said central shaft;
   a worm drive gear proximate to said first side plate and operatively connected to said central shaft to be rotated upon the rotation thereof;
   a worm shaft coupled to said worm drive gear for rotation thereby, said worm gear connecting and spanning the distance between said side plates in spaced parallel relation to said spool;
   a line guide engaging said worm shaft such that when said worm shaft is rotated, said line guide traverses along the length of said worm shaft;
   a recess in said first side plate positioned to provide access to the worm drive gear and worm shaft from the exposed side of said first side plate; and
   a removable side plate ring for covering the perimeter of said first side plate including a portion covering said recess proximate to said worm drive gear, and comprising an annular face part overlying the marginal portion of said first side plate and a circumferential flange projecting inwardly about the entire outer periphery of said face part and dimensioned to snugly embrace the outer periphery of said first side plate.

7. A fishing reel according to claim 6 wherein said recess-covering portion of said side plate ring and said face part are co-planar and said flange is at right angles to said face part.

* * * * *